(12) United States Patent
Han et al.

(10) Patent No.: US 7,604,473 B2
(45) Date of Patent: Oct. 20, 2009

(54) INJECTION APPARATUS HAVING A MICROWAVE GENERATION PART

(75) Inventors: Young Gil Han, Gyeonggi-do (KR); Jong Woon Park, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 87 days.

(21) Appl. No.: 11/705,690

(22) Filed: Feb. 13, 2007

(65) Prior Publication Data

US 2007/0231423 A1 Oct. 4, 2007

(30) Foreign Application Priority Data

Mar. 29, 2006 (KR) .................. 10-2006-0028503

(51) Int. Cl.
*B29C 45/20* (2006.01)
(52) U.S. Cl. .................................. 425/174; 425/174.4
(58) Field of Classification Search .................. 425/174, 425/174.4

See application file for complete search history.

(56) References Cited

U.S. PATENT DOCUMENTS 6,394,784 B1 * 5/2002 Gellert et al. ............... 425/549

2004/0185137 A1 * 9/2004 Hashemi ..................... 425/549

FOREIGN PATENT DOCUMENTS

| JP | 58220715 | 12/1983 |
| JP | 60007136 | 1/1985 |
| JP | 02026710 | 1/1990 |
| JP | 10180832 | 7/1998 |
| KR | 20-0169063 | 2/2000 |

OTHER PUBLICATIONS

European Search Report for the corresponding European Patent Application, dated Sep. 17, 2008.

* cited by examiner

*Primary Examiner*—Tim Heitbrink
(74) *Attorney, Agent, or Firm*—Ohlandt, Greeley, Ruggiero & Perle, L.L.P.

(57) ABSTRACT

Disclosed herein is an injection apparatus and control method thereof. The apparatus comprises a nozzle to guide a raw material to flow into an injection mold, a microwave transmission part positioned at a portion of the nozzle, and a microwave generation part positioned near the nozzle to generate and irradiate microwaves to the microwave transmission part. With this structure, vulcanization of the raw material injected into the injection mold occurs uniformly and rapidly within the injection mold, thereby improving a quality of an injection molded product while increasing a speed of injection operation.

15 Claims, 10 Drawing Sheets

INJECTION APPARATUS HAVING A MICROWAVE GENERATION PART

CROSS-REFERENCE TO RELATED APPLICATIONS

This application claims the benefit under 35 U.S.C. §119 of Korean Patent Application No. 2006-0028503, filed on Mar. 29, 2006 in the Korean Intellectual Property Office, the disclosure of which is incorporated herein by reference.

BACKGROUND OF THE INVENTION

1. Field of the Invention

The present disclosure relates to an injection apparatus, and, more particularly, to an injection apparatus, which allows vulcanization of a material injected into an injection mold to occur uniformly and rapidly within the injection mold, thereby improving a quality of an injection molded product while increasing a speed of an injection operation.

2. Description of the Related Art

An injection apparatus refers to an apparatus which produces an article having a desired shape by injecting a raw material, such as a rubber or plastic material, having fluidity at high temperatures, into an injection mold having a predetermined shape corresponding to the desired shape of the product, followed by cooling the raw material.

A conventional injection apparatus disclosed in Korean Utility Model Registration No. 20-0169063 comprises an upper frame, a lower frame, an injection mold disposed between the upper and lower frames, and a raw material feeder positioned at one side of the upper frame, wherein the upper frame is provided with an injection chamber to receive the raw material supplied into the upper frame from the raw material feeder, and with a nozzle to guide movement of the raw material into the injection mold.

Above the nozzle, an injection plunger is positioned to compress the raw material to be injected into the nozzle through the injection chamber, and an injection cylinder to generate driving force to move the injection plunger up and down.

The upper frame is provided at a lower portion with an upper heater, and the lower frame is provided at an upper portion with a lower heater such that a mold is positioned between the upper and lower heaters. The mold is divided into an upper mold and a lower mold so that the upper mold is brought into contact with the upper heater and the lower mold is brought into contact with the lower heater.

With this construction, as the injection apparatus is operated, a raw material is induced into the injection chamber by the raw material feeder, and when the injection cylinder is operated, the injection plunger is lowered, causing the raw material to be induced into the nozzle.

After moving along the nozzle, the raw material is injected into the mold connected to an end of the nozzle. When the heaters provided to the upper and lower portions of the mold are operated to generate heat, the heat is transferred from the heaters to the raw material via the mold. At this point, the heaters heat the raw material, for example, a rubber, to a temperature suitable for vulcanization in the mold.

The term "vulcanization" refers to a reaction to impart elasticity to the rubber by coupling sulfur to structure of the rubber. At this point, a predetermined amount of heat is required for chemical coupling of the sulfur, simply mixed with the rubber, to the structure of the rubber. In this regard, according to the conventional injection apparatus, heat for the vulcanization is supplied from the heaters.

Meanwhile, since the raw material, in particular, the rubber, has a relatively low thermal conductivity, heat can be efficiently transferred to a portion of the raw material along an inner surface of the mold, which contacts the raw material. However, the heat cannot be efficiently transferred to a portion of the raw material near a central region of the mold, causing a temperature deviation in the raw material.

Hence, since it is necessary to wait until the heat is transferred to the central region of the mold in order to allow the vulcanization of the raw material to occur in an overall region within the mold, there is a problem of extending a time for injection operation.

In addition, although an outer surface of an injected product may have a desired elasticity even with insufficient transfer of heat into the central region of the raw material, an interior of the product cannot have the desired elasticity, failing to achieve a uniform quality.

Furthermore, a low thermal conductivity of the raw material causes local overheating of the raw material within the mold, thereby causing local acceleration of vulcanization, which results in defects such as flow-marks on an outer surface of the product.

Accordingly, there is a need for an injection apparatus that overcomes, alleviates, and/or mitigates one or more of the aforementioned and other deleterious effects of prior art injection apparatuses.

SUMMARY OF THE INVENTION

The present disclosure has been made in view of the above and other problems, and an aspect of the present disclosure is to provide an injection apparatus, which enables uniform and rapid vulcanization of a raw material injected into an injection mold.

It is another aspect of the present disclosure to provide the injection apparatus, which can prevent local vulcanization of the raw material within the injection mold so that an injected product can be free from defects such as flow-marks on an outer surface thereof, thereby improving a quality of the product.

Additional aspects and/or advantages of the disclosure will be set forth in part in the description that follows and, in part, will be apparent from the description, or may be learned by practice of the disclosure.

In accordance with one aspect of the present disclosure, there is provided an injection apparatus, comprising: a nozzle to guide a raw material to flow into an injection mold; a microwave transmission part positioned at a portion of the nozzle; and a microwave generation part positioned near the nozzle to generate and irradiate microwaves to the microwave transmission part.

The injection apparatus may further comprise a guide member connected to the microwave transmission part to guide the microwaves to the microwave transmission part.

The guide member may comprise a resonance chamber receiving a portion of the nozzle while being communicated with the microwave generation part to allow resonance of the microwaves.

The guide member may further comprise a waveguide through which the resonance chamber is communicated with the microwave generation part.

The nozzle may comprise a first nozzle comprising an induction hole through which the raw material is induced into the injection mold, a second nozzle connected to the first nozzle while constituting the microwave transmission part, and a third nozzle connected to the second nozzle and comprising a communication hole communicated with the injection mold.

The microwave generation part may comprise a magnetron to generate the microwaves, and a back flow prevention device to prevent a back flow of the microwaves generated by the magnetron.

The resonance chamber may surround the second nozzle, and cause the microwaves induced into the resonance chamber to be resonated therein and be then irradiated to the second nozzle.

The resonance chamber may have a hollow box shape, and the second nozzle may penetrate upper and lower surfaces of the resonance chamber while being spaced a predetermined distance from respective sidewalls. The second nozzle may be composed of quartz.

The injection apparatus may further comprise a temperature controller around the nozzle to prevent a rapid increase in temperature of the raw material passing through the nozzle.

The temperature controller may comprise a first temperature controller positioned around the first nozzle, and a second temperature controller positioned around the third nozzle.

The first temperature controller may comprise a cold water pipe through which cold water can flow, and the second temperature controller may comprise a heat exchanger to cool the third nozzle.

The injection apparatus may further comprise a controller connected to the magnetron to control operation of the magnetron, wherein the controller comprises a power source to supply power and a microwave output variation device to vary an output of the microwaves.

In accordance with another aspect of the present disclosure, there is provided a method for controlling an injection apparatus comprising: an injection plunger; a nozzle to guide a raw material subjected to pressure of the injection plunger into an injection mold; a microwave transmission part positioned at a portion of the nozzle; a microwave generation part positioned near the nozzle to generate and irradiate microwaves to the microwave transmission part; and a controller to control operation of the microwave generation part, the method comprising: driving the microwave generation part to generate the microwaves when the injection plunger compresses the raw material; detecting a temperature of the raw material flowing through the nozzle, followed by varying an output of the microwaves; and stopping the microwave generation part in response to complete filling of the injection mold with the raw material.

In varying the output of the microwaves, the output of the microwaves is varied to allow the raw material to have a temperature in the range of causing vulcanization of the raw material when the microwaves are irradiated to the raw material in the nozzle.

BRIEF DESCRIPTION OF THE DRAWINGS

These and/or other aspects and advantages of the disclosure will become apparent and more readily appreciated from the following description of the embodiments, taken in conjunction with the accompanying drawings, of which.

DETAILED DESCRIPTION OF THE PREFERRED EMBODIMENTS

Figure 1:
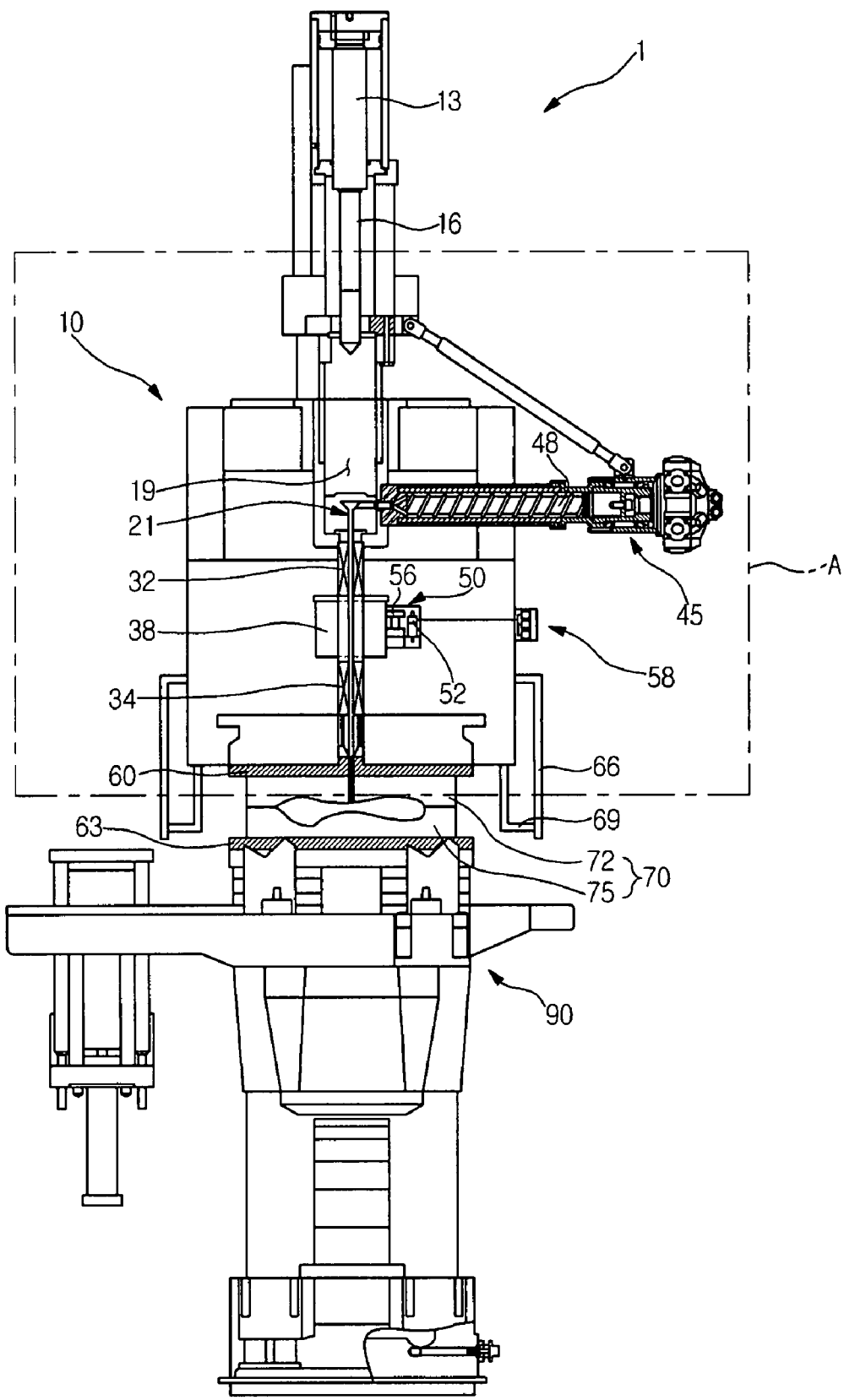
FIG. 1 is a front sectional view of an injection apparatus according to a first embodiment of the present disclosure.

Reference will now be made in detail to the embodiments of the present disclosure, examples of which are illustrated in the accompanying drawings, wherein like reference numerals refer to like elements throughout the drawings. The embodiments are described below to explain the disclosure by referring to the figures.

FIGS. 1 to 4 show an injection apparatus according to a first embodiment of the present disclosure. Referring to FIG. 1, an injection apparatus 1 of the present disclosure comprises an upper frame 10 having an injection chamber 19 defined therein to receive a raw material upon injection of the raw material, a lower frame 90, an injection plunger 16 positioned above the injection chamber 19, and a cylinder 13 to cause a vertical movement of the injection plunger 16.

A raw material feeder 45 is positioned at one side of the upper frame 10 while being communicated with one side of the injection chamber 19 to feed the raw material into the injection chamber 19, and is installed therein with a conveying screw 48 which can efficiently convey the raw material into the injection chamber 19.

The injection chamber 19 is provided with a nozzle 21, which has one end positioned inside the injection chamber 19 and the other end connected to an injection mold 70 disposed between the upper and lower frames 10 and 90, such that the raw material is guided along the nozzle 21 from the injection chamber 19 into the injection mold 70.

The nozzle 21 is disposed vertically within the upper frame 10, and provided with first and second temperature controllers 32 and 34, which surround the nozzle 21 to prevent an excessive increase in temperature of the raw material flowing through the nozzle 21.

The injection apparatus further comprises a microwave generation part 50 near the nozzle 21 to generate and irradiate microwaves to the nozzle 21.

A resonance chamber 38 is installed in the upper frame 10, and receives a portion of the nozzle 21 therein. The resonance chamber 38 is connected to the microwave generation part 50, so that the microwaves generated from the microwave generation part 50 can propagate into the resonance chamber 38 and be resonated therein to cause molecular vibration of moisture contained in the raw material flowing through the nozzle 21, thereby increasing the temperature of the raw material.

A vacuum cover 66 and a vacuum ram 69 capable of moving the vacuum cover 66 up and down are installed at a lower portion of the upper frame 10. When injection operation is started, the vacuum cover 66 and the vacuum ram 69 are lowered and surround the injection mold 70, thereby shielding a space inside the vacuum cover 66 from an outside.

Then, a vacuum pump (not shown) is operated and completely evacuates the space inside the vacuum cover 66 in order to make the space inside the vacuum cover 66 a vacuum state, so that defects of the product caused by bubbles can be prevented from being generated during the injection operation.

Figure 2:
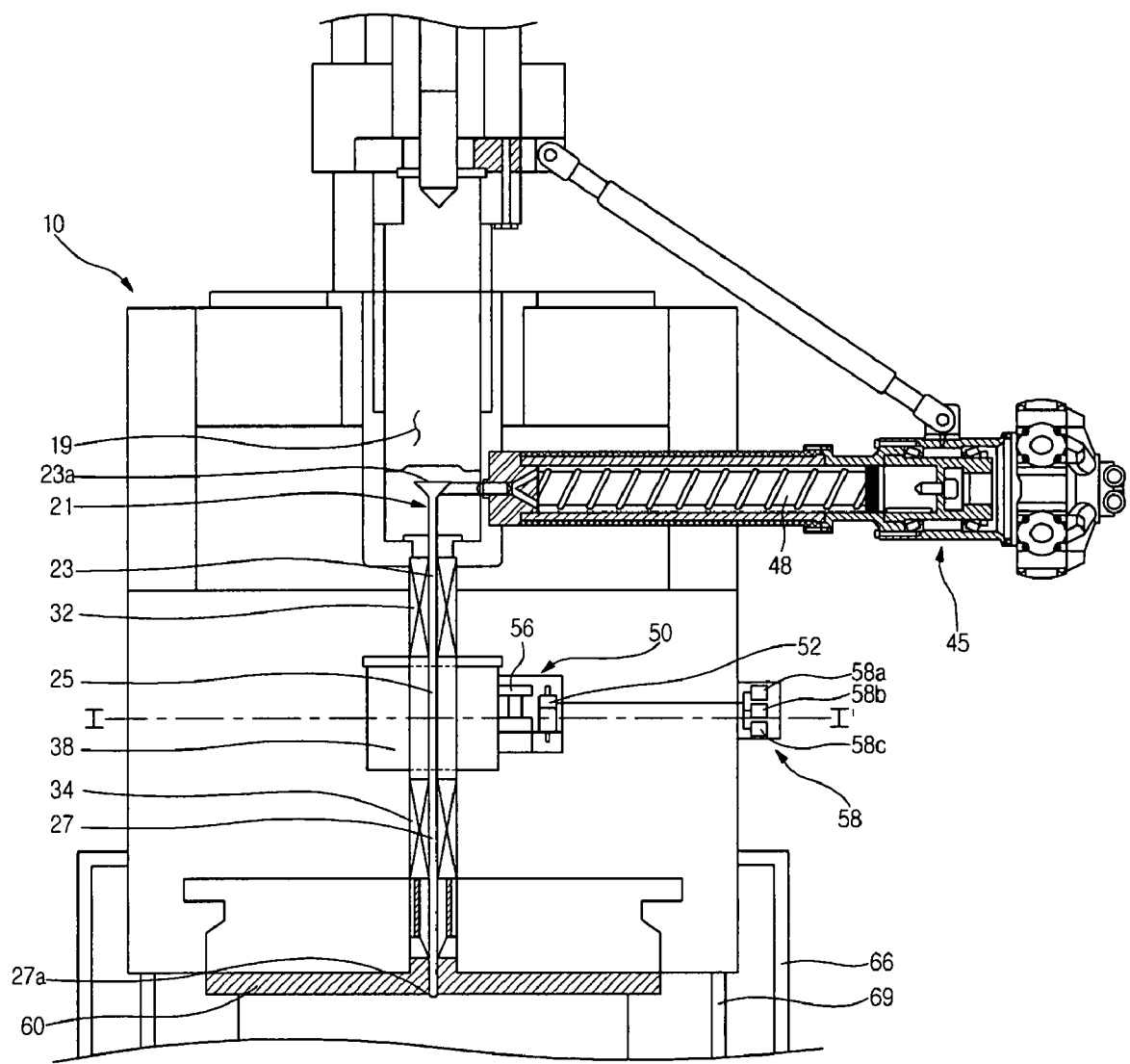
FIG. 2 is an enlarged view illustrating Part A of FIG. 1.

Referring to FIG. 2, the nozzle 21 comprises a first nozzle 23, a second nozzle 25, and a third nozzle 27. The first nozzle 23 is formed at one end with an induction hole 23a through which the first nozzle 23 is communicated with the injection chamber 19, the second nozzle 25 is communicated with the first nozzle 23, and the third nozzle 27 is connected to a lower end of the second nozzle 25 while being communicated with the injection mold 70.

The second nozzle 25 is received in the resonance chamber 38. Here, the second nozzle 25 is composed of a material permitting transmission of microwaves therethrough. Preferably, the second nozzle 25 is composed of quartz.

The first and second temperature controllers 32 and 34 are respectively positioned around the first and third nozzles 23 and 27 to prevent an excessive increase in temperature of the raw material passing through the first and third nozzles 23 and 27 due to friction and molecular vibration.

Preferably, the first and second temperature controllers 32 and 34 comprise either a cold water pipe through which cold water flows or a heat exchanger.

The microwave generation part 50 is installed at one side of the resonance chamber 38. The microwave generation part 50 comprises a magnetron 52 to generate the microwaves, and a back flow prevention device 56 to prevent a back flow of the microwaves propagating to the resonance chamber 38.

A controller 58 is positioned outside the upper frame 10 to control operation of the magnetron 52, and comprises a power supply 58b to supply power to the magnetron 52 and a microwave output variation device 58a to vary an output of the microwaves according to circumstances.

Figure 3:
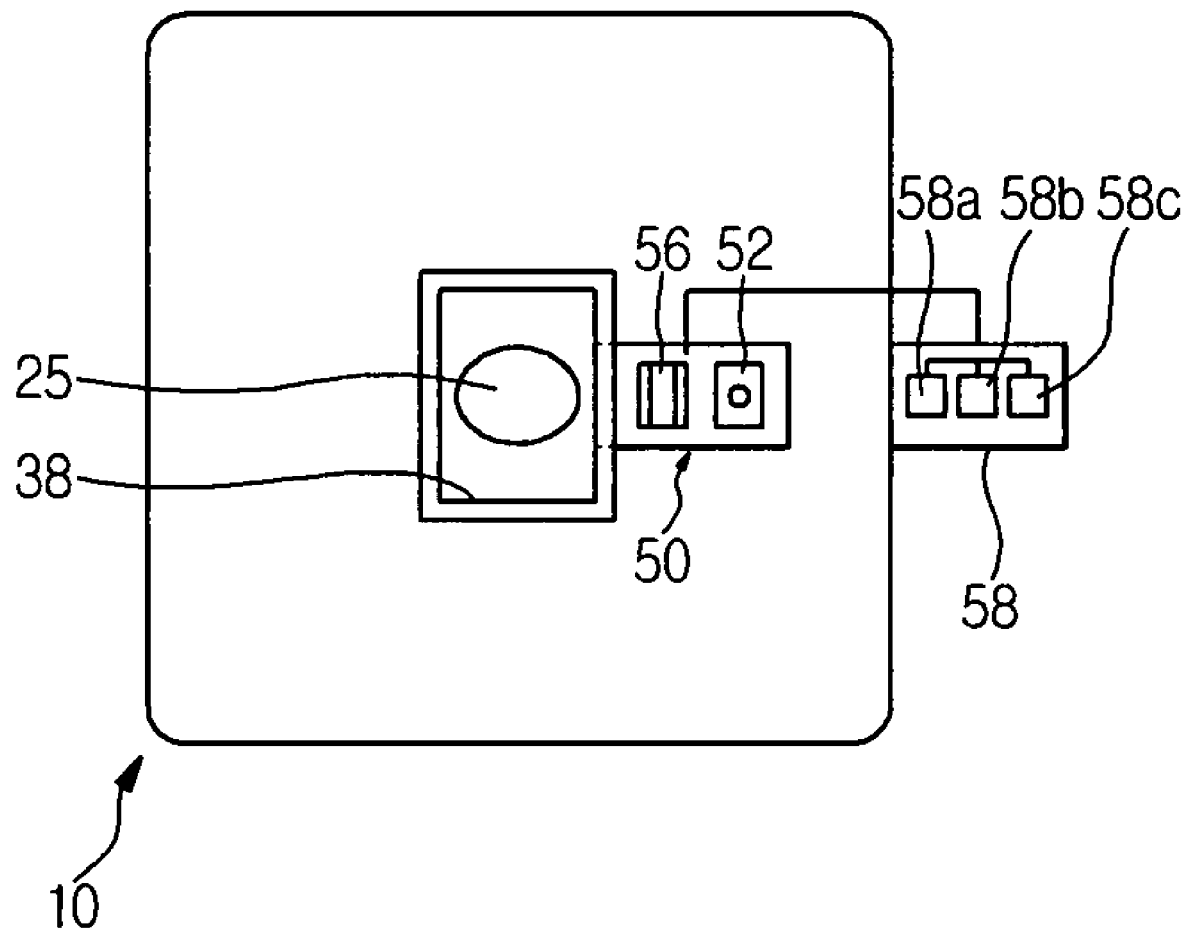
FIG. 3 is a horizontal sectional view taken along line I-I' of FIG. 2.

Referring to FIG. 3, an interior of the upper frame 10 is shown, in which the second nozzle 25 is received in the resonance chamber 38, and spaced a predetermined distance from sidewalls of the resonance chamber 38.

The resonance chamber 38 has a hollow box shape. This structure is provided with an aim of more effectively heating the raw material passing through the second nozzle 25 by improving resonance effect of the microwaves which are being induced into the resonance chamber 38.

Operation of the injection apparatus according to the first embodiment will be described with reference to the accompanying drawings.

As shown in FIG. 1, before a raw material is injected into the injection chamber 19, the injection plunger 16 is located at an upper portion within the injection chamber 19, the vacuum ram 69 and the vacuum cover 66 are separated from the lower frame 90, and the microwave generation part 50 is in a non-operating state.

Figure 4:
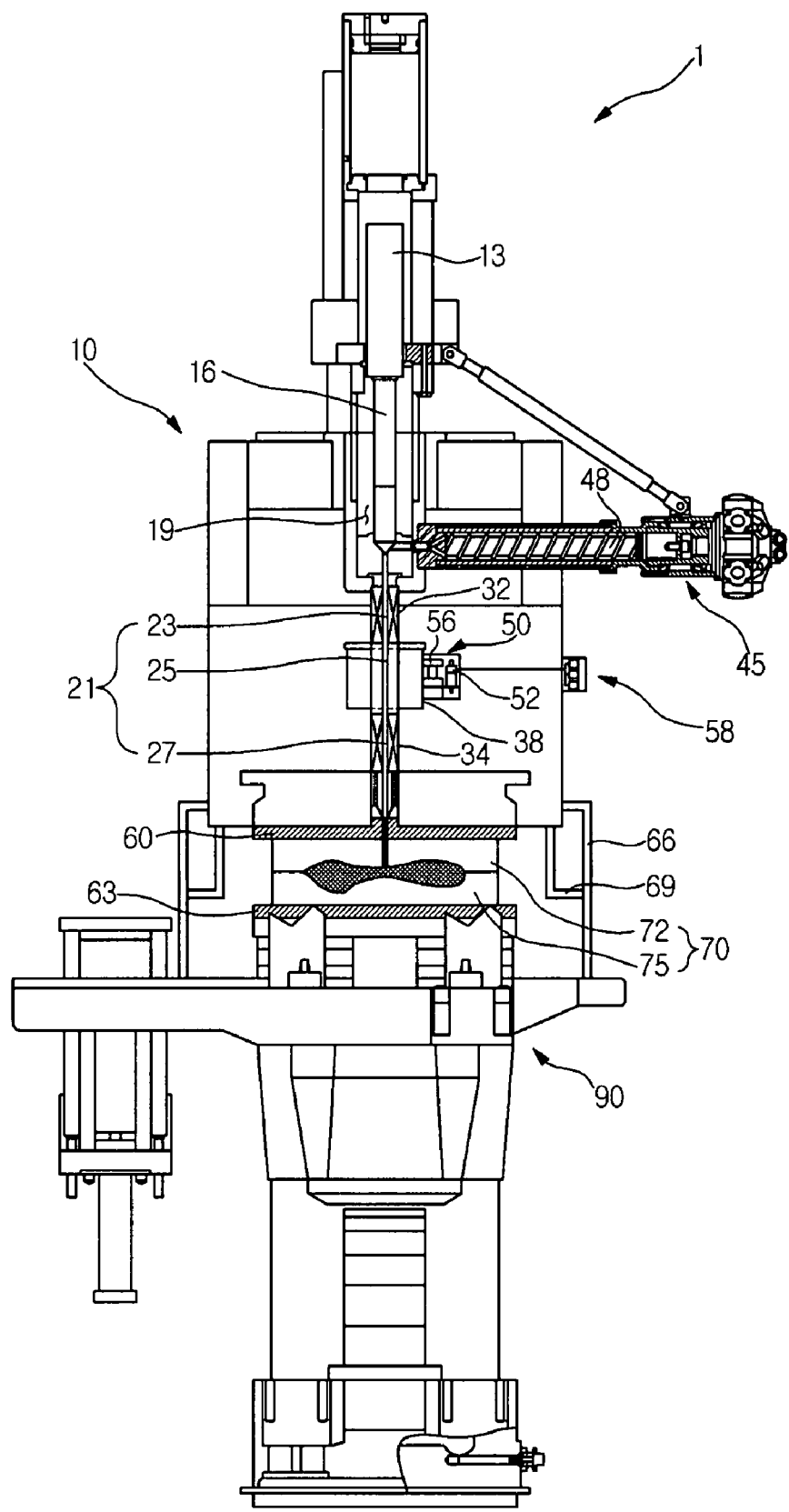
FIG. 4 is a front sectional view illustrating operation of the injection apparatus according to the first embodiment.

Then, as shown in FIG. 4, when the raw material is injected into the injection chamber 19, the injection plunger 16 is lowered and compresses the raw material such that the raw material sequentially passes through the first, second and third nozzles 23, 25 and 27 of the nozzle 21.

A rubber in a paste state is used as the raw material so that, when the paste rubber passes through the first nozzle 23, friction occurs between the rubber and the first nozzle 23, probably causing a rapid increase in the temperature. At this point, the first temperature controller 32 positioned around the first nozzle is operated to maintain the temperature in a predetermined range.

With the temperature maintained in a suitable range as described above, the raw material is moved to the second nozzle 25, and generates heat therein.

Specifically, since the magnetron 52 is in an operating state before the raw material enters the second nozzle 25, the raw material located within the second nozzle 25 generates heat by virtue of the microwaves generated by the magnetron 52. Such an exothermic reaction results from vibration of water molecules in the raw material by means of the microwaves.

During the exothermic reaction, the raw material preferably has a temperature of around 100 to 130 degrees, which is appropriate for vulcanization of the raw material.

When the raw material is moved to the third nozzle 27, with the temperature of the raw material increased to around a degree of allowing the vulcanization of the raw material via the exothermic reaction, the second temperature controller 34 is operated to prevent an excessive increase in temperature above a temperature appropriate for vulcanization due to frictional heat inside the third nozzle 27.

Preferably, the second temperature controller 34 has a pipe shape through which cold water can flow, or comprises a heat exchanger.

As such, the raw material is subjected to the exothermic process and the cooling process while flowing from the first nozzle 23 to the third nozzle 27, and is then induced into the injection mold 70.

At this point, the upper and lower heaters 60 and 63 are positioned at the upper and lower portions of the injection mold 70, and serve to apply heat to ensure the vulcanization of the raw material injected into the injection mold 70 occurs constantly and stably.

Since the raw material is injected into the injection material 70 after reaching the temperature permitting the vulcanization of the raw material, the vulcanization of the raw material can occur even though the heat is not applied to the raw material by the upper and lower heaters 60 and 63. In this regard, the present disclosure is differentiated from the conventional technique in that application of heat by the upper and lower heaters 60 and 63 is provided with an aim of ensuring constant vulcanization of the raw material which is already underway.

Meanwhile, from when the injection operation is started, the lower end of the vacuum cover 66 is lowered to an upper portion of the lower frame 10, and surrounds the injection mold 70 such that the vacuum cover 66 shields the injection mold 70 from external air to make a vacuum state around the injection mold 70, thereby preventing defects of the product from being generated by air bubbles.

Then, when the injection mold 70 is completely filled with the raw material, the magnetron 52 is stopped so as not to generate the microwaves, and the upper heater 60 and the lower heater 63 are operated until the vulcanization of the raw material is completed within the injection mold 70.

Then, when the vulcanization of the raw material is completed, the upper and lower heaters 60 and 63 are stopped, and the vacuum cover 66 is lifted by the vacuum ram 69.

After the injection mold 70 is cooled below the vulcanization temperature, the injection mold 70 is separated to the upper and lower molds, and an injected product is ejected from the injection mold 70.

FIGS. 5 to 8 show an injection apparatus according to a second embodiment of the present disclosure. The same components will be denoted by the same reference numerals as those of the first embodiment.

Figure 5:
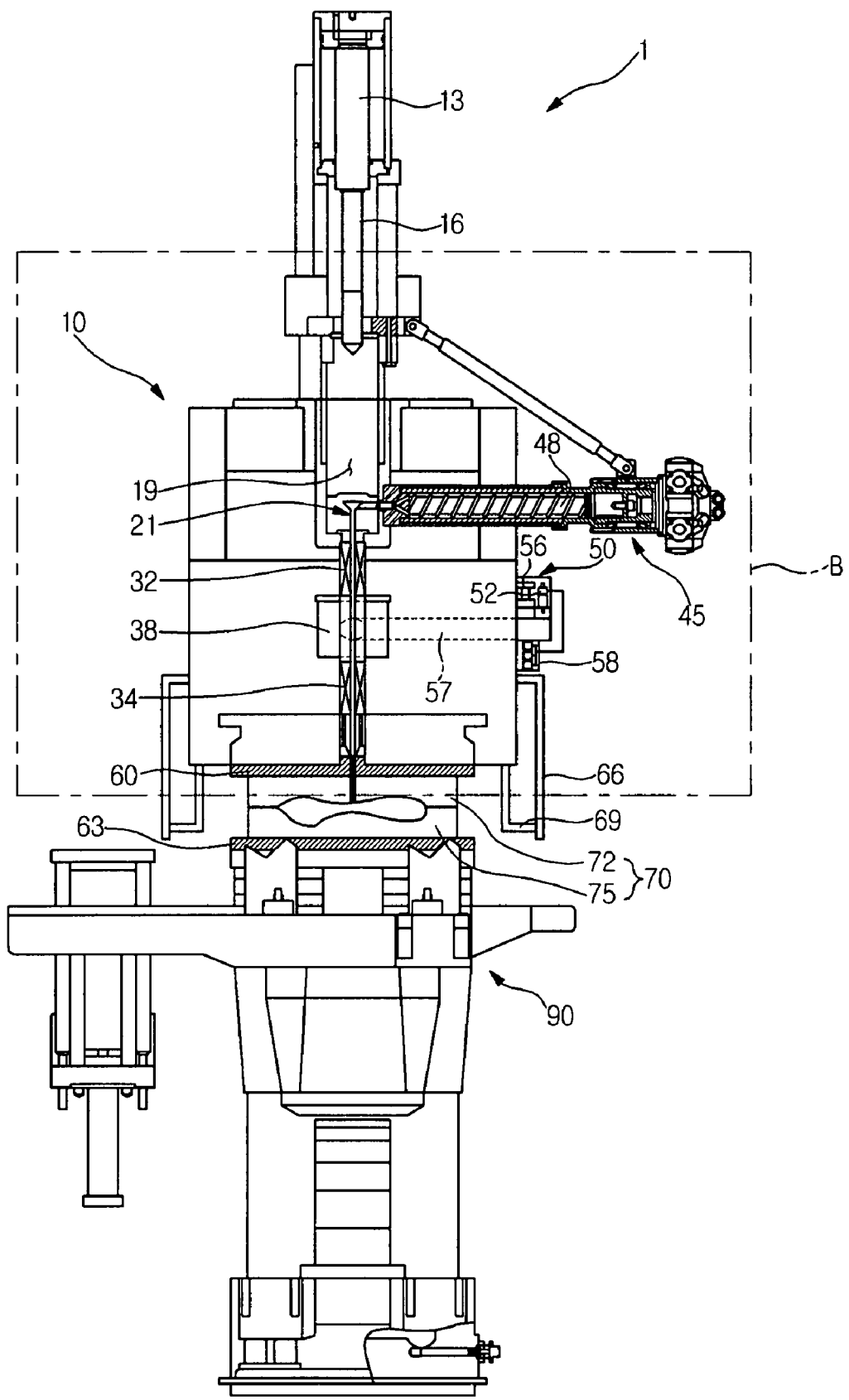
FIG. 5 is a front sectional view of an injection apparatus according to a second embodiment of the present disclosure.
Figure 6:
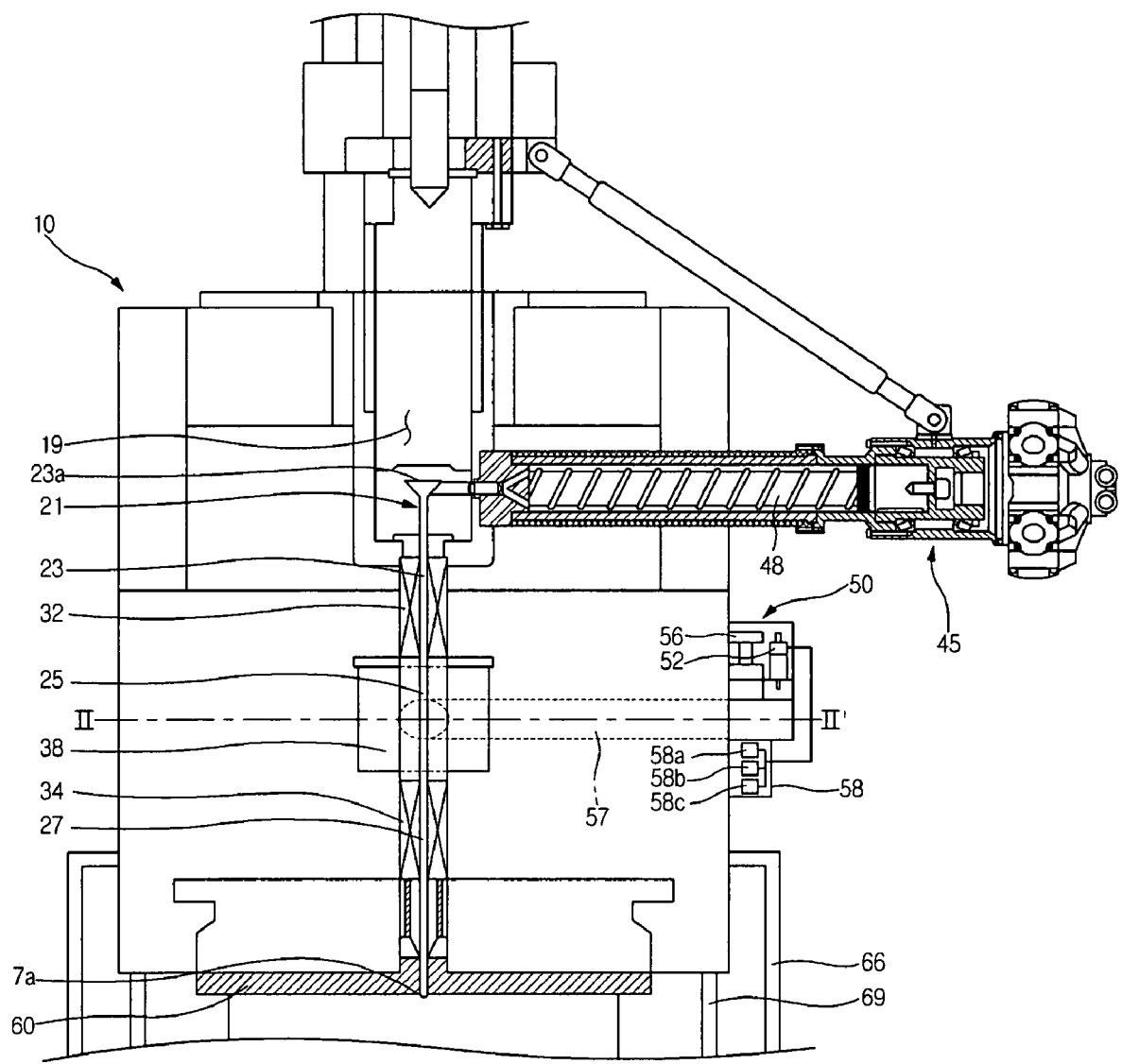
FIG. 6 is an enlarged view illustrating Part B of FIG. 5.
Figure 7:
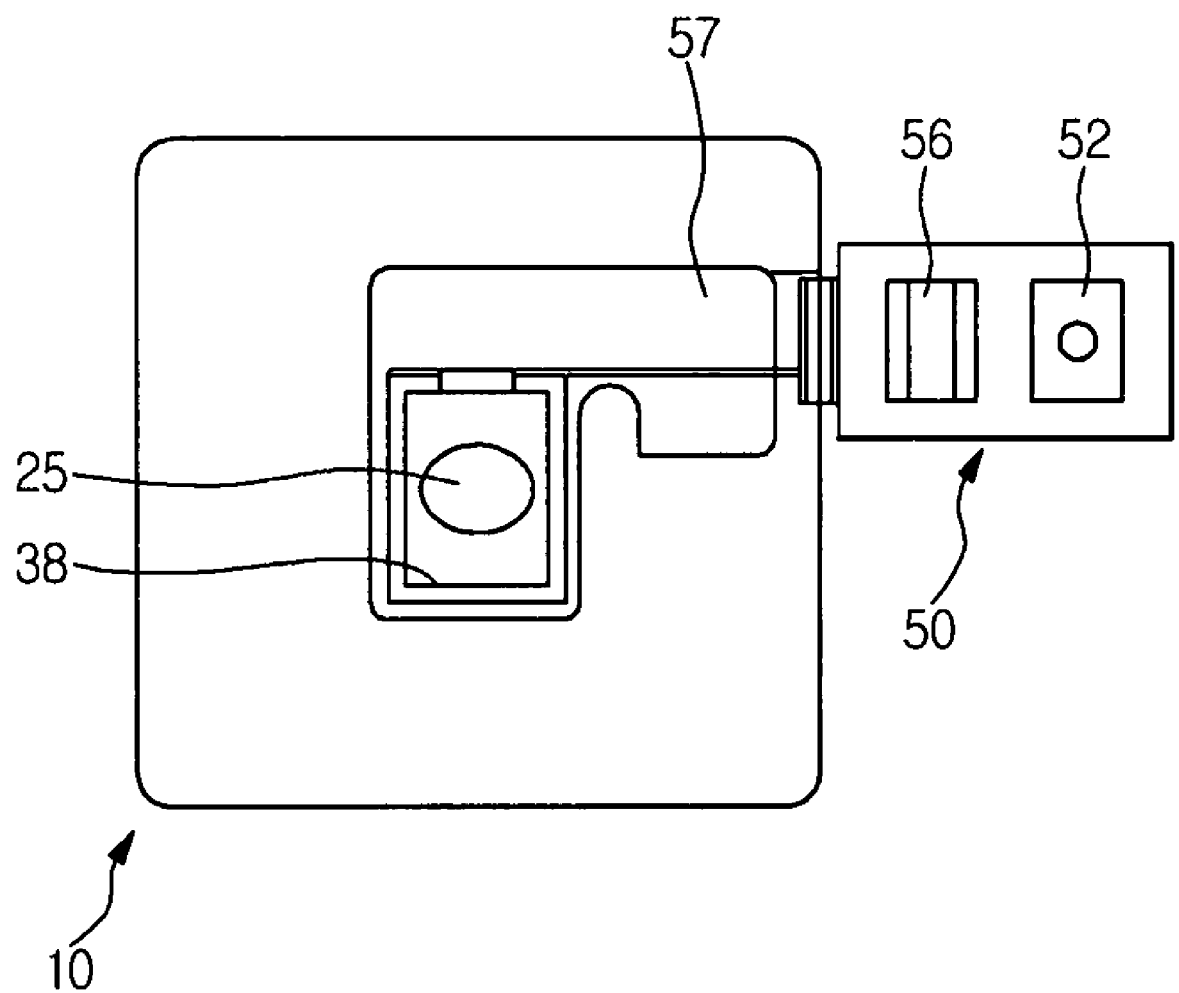
FIG. 7 is a horizontal sectional view taken along line II-II' of FIG. 6.
Figure 8:
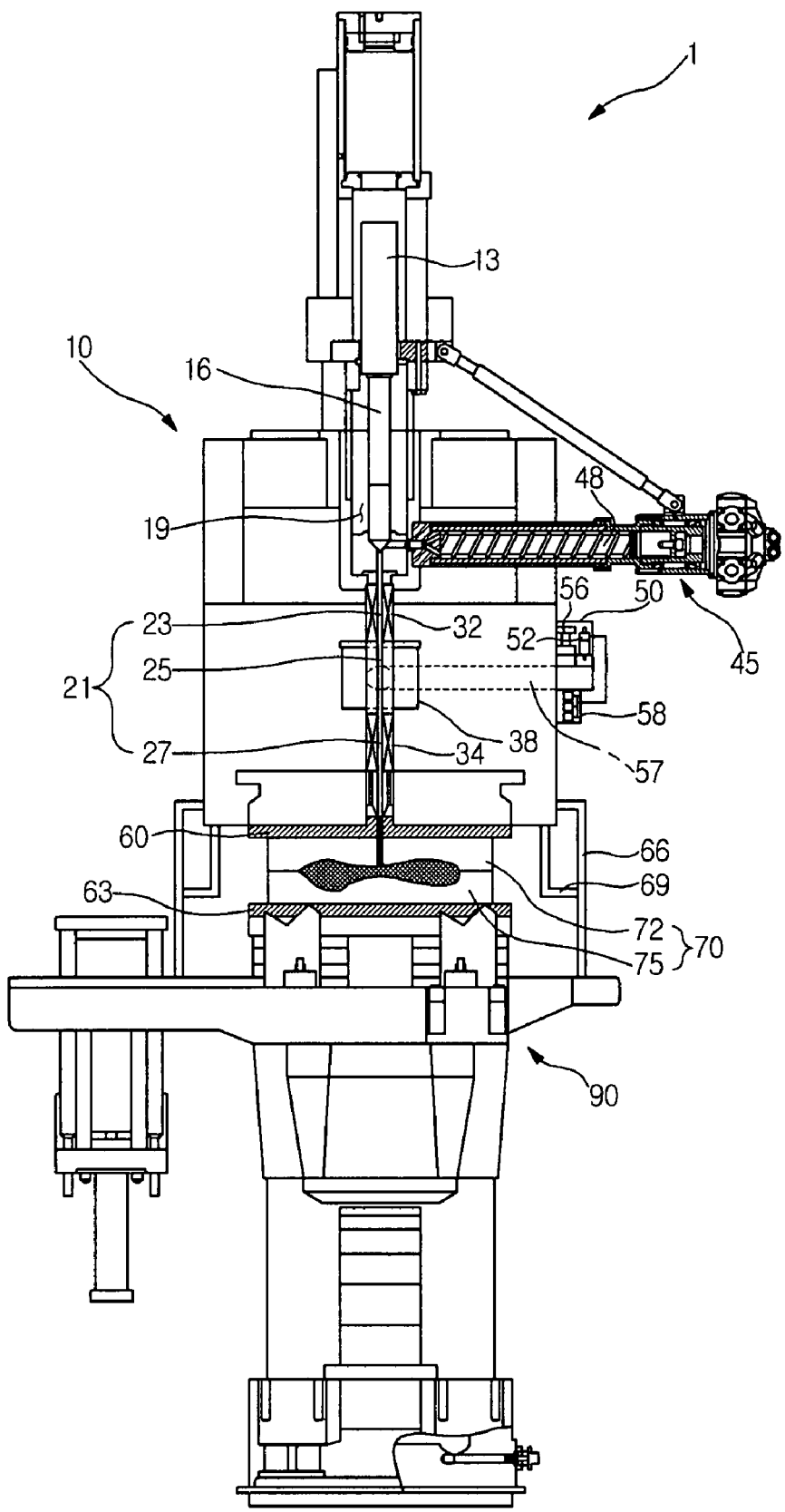
FIG. 8 is a front sectional view illustrating operation of the injection apparatus according to the first embodiment.

Referring to FIGS. 5 to 7, an upper frame 10 constituting an upper body of an injection apparatus 1 has a nozzle 21, which comprises a first nozzle 23, a second nozzle 25, and a third nozzle.

The second nozzle 25 is disposed in a resonance chamber 38 which is connected to a waveguide 57 extending to a side surface of the upper frame 10.

A microwave generation part 50 comprises a magnetron 52 and a back flow prevention device 56 to prevent a back flow of microwaves. The magnetron 52 is connected to a controller 58 which controls operation of the magnetron 52.

The second embodiment is differentiated from the first embodiment in that the microwave generation part 50 is installed inside the upper frame 10, and in that the microwave generation part 50 is communicated with the resonance chamber 38 via the waveguide 57. Excluding these components, the second embodiment has the same construction as that of the first embodiment, and redundant description thereof will be omitted herein.

In view of operation of the injection apparatus according to the second embodiment, the same components of the second embodiment are operated in the same way as those of the first embodiment. Exceptionally, microwaves generated by the magnetron 52 are directed to the resonance chamber 38 under guidance of the waveguide 57 to generate heat within the raw material passing through the second nozzle 25. When being induced into the resonance chamber 38, the microwaves cause vibration of water molecules in the raw material inside the second nozzle 25 while being resonated in the resonance chamber 38, causing an exothermic reaction of the raw material.

Operations of other components of the second embodiment are the same as those of the first embodiment, and redundant description thereof will be omitted herein. Thus, description of the operation of the microwave generation part 50, installed at one side of the upper frame 10, will be omitted.

A method for controlling an injection apparatus according to the present disclosure will be described hereinafter.

Figure 9:
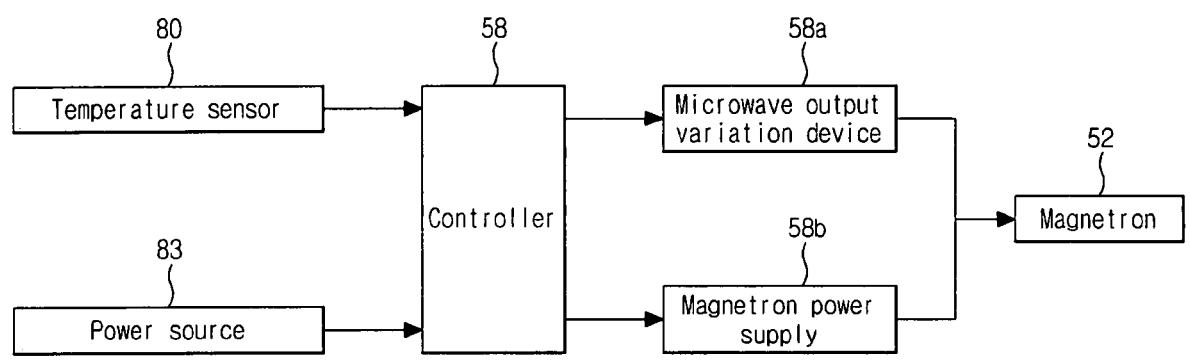
FIG. 9 is a block diagram of a controller of the injection apparatus according to the present disclosure.

Referring to FIG. 9, a controller 58 has an input side, to which a temperature sensor 80 to detect the temperature of a raw material passing through a nozzle and a power source 83 to supply power are connected, and an output side, to which a microwave output variation device 58a to vary a frequency of microwaves from the magnetron 52 and a magnetron power supply 58b to supply power to the magnetron 52 are connected.

Accordingly, after detecting the temperature of the raw material through the temperature sensor 80, the controller 58 varies the frequency of microwaves generated by the magnetron 52 on the basis of the detected temperature in order to increase the temperature of the raw material to a vulcanization temperature thereof. At this point, such an operation of varying the frequency of the magnetron is performed by the microwave output variation device 58a.

In addition, the magnetron power supply 58b serves to turn-on/off power of the magnetron 52 according to start and stop of the injection operation.

Figure 10:
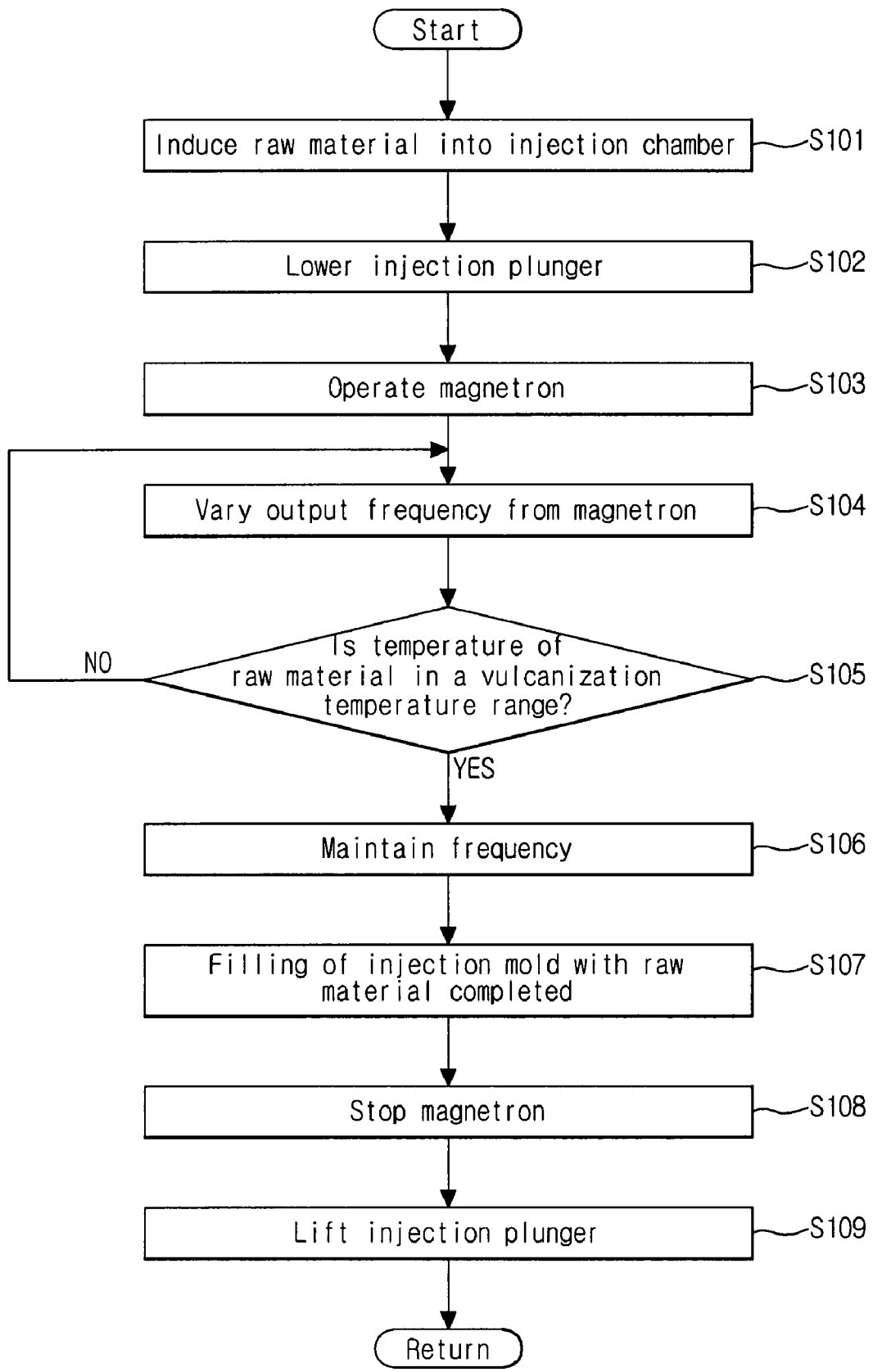
FIG. 10 is a flow chart illustrating a method for controlling an injection apparatus according to the present disclosure.

In FIG. 10, a flow chart of a method for controlling the injection apparatus according to the present disclosure is shown.

First, when a raw material is induced into an injection chamber by a raw material feeder, an injection operation is started (S101). Then, an injection plunger is lowered by an injection cylinder, and compresses the raw material to move towards a nozzle (S102).

As soon as the injection plunger is lowered, a magnetron is operated to generate microwaves (S103). The microwaves are irradiated to a second nozzle. At this point, at an initial stage of generating the microwaves by the magnetron, an output frequency of microwaves is adjusted by a microwave output variation device (S104).

If it is determined that the temperature of the raw material flowing through the nozzle reaches a vulcanization temperature of the raw material, the microwave output variation device maintains the output frequency of the microwaves (S105 & S106). On the other hand, if it is determined that the temperature of the raw material is less than the vulcanization temperature of the raw material, the microwave output variation device increases the output frequency of the microwaves, and if it is determined that the temperature of the raw material is more than the vulcanization temperature thereof, the microwave output variation device decreases the output frequency of the microwaves. According to the present disclosure, it is preferable that the vulcanization temperature of the raw material be in the range of around 100 to 130 degrees.

Next, the raw material is continuously supplied to an injection mold until it is completely filled with the raw material. Here, since the raw material has already reached the vulcanization temperature of the raw material, vulcanization of the raw material actively occurs at the center of the injection mold.

When the injection mold is completely filled with the raw material (S107), the magnetron is stopped so as not to generate the microwaves anymore (S108), and the injection plunger is lifted back to an original position for the next injection operation (S109).

As apparent from the above description, according to the present disclosure, the raw material is injected into the injection mold after reaching the temperature permitting the vulcanization of the raw material, so that the vulcanization of the raw material can occur while entering the injection mold.

As such, when the raw material is injected into the injection mold, the injection apparatus according to the present disclosure enables vulcanization of the raw material to occur in the injection mold without any delay due to heating and the like as in the conventional technique, thereby reducing a time for the injection operation.

Specifically, according to the conventional technique, the raw material is vulcanized only after the raw material is induced into the injection mold and heated to the vulcanization temperature of the raw material by heaters, causing a problem of extending the time for injection operation. However, the injection apparatus of the present disclosure can solve such a problem.

Furthermore, according to the present disclosure, the raw material is injected into the injection mold after reaching the temperature permitting the vulcanization of the raw material, so that the vulcanization of the raw material can occur uniformly within the injection mold, thereby providing a product having an entirely uniform quality.

Specifically, in the case where the raw material is a rubber having a significantly low thermal conductivity, heat cannot be sufficiently transferred to a portion of the raw material near a central region of the injection mold, causing insufficient vulcanization of that portion of the raw material. Even in this case, however, according to the present disclosure, the raw material can have a suitable vulcanization temperature at any location within the injection material, thereby overcoming the problem of non-uniform vulcanization of the raw material.

Although a few embodiments of the present disclosure have been shown and described, it would be appreciated by those skilled in the art that various modifications, additions and substitutions may be made in these embodiments without departing from the principle and spirit of the disclosure, the scope of which is defined in the claims and their equivalents.

What is claimed is:

1. An injection apparatus, comprising:
   a nozzle to guide a raw material to flow into an injection mold;
   a microwave transmission part positioned at a portion of the nozzle; and
   a microwave generation part positioned near the nozzle to generate and irradiate microwaves to the microwave transmission part,
   wherein the microwave generation part comprises a magnetron to generate the microwaves.

2. The injection apparatus according to claim 1, further comprising:
   a guide member connected to the microwave transmission part to guide the microwaves to the microwave transmission part.

3. The injection apparatus according to claim 2, wherein the guide member comprises a resonance chamber receiving a portion of the nozzle while being communicated with the microwave generation part to allow resonance of the microwaves.

4. The injection apparatus according to claim 3, wherein the guide member further comprises a waveguide through which the resonance chamber is communicated with the microwave generation part.

5. The injection apparatus according to claim 3, wherein the nozzle comprises a first nozzle comprising an induction hole through which the raw material is induced into the injection mold, a second nozzle connected to the first nozzle while constituting the microwave transmission part, and a third nozzle connected to the second nozzle and comprising a communication hole communicated with the injection mold.

6. The injection apparatus according to claim 4, wherein the nozzle comprises a first nozzle comprising an induction hole through which the raw material is induced into the injection mold, a second nozzle connected to the first nozzle while constituting the microwave transmission part, and a third nozzle connected to the second nozzle and comprising a communication hole communicated with the injection mold.

7. The injection apparatus according to claim 1, wherein the microwave generation part further comprises a back flow prevention device to prevent a back flow of the microwaves generated by the magnetron.

8. The injection apparatus according to claim 3, wherein the resonance chamber surrounds the second nozzle, and causes the microwaves induced into the resonance chamber to be resonated therein and then irradiated to the second nozzle.

9. The injection apparatus according to claim 8, wherein the resonance chamber has a hollow box shape, and the second nozzle penetrates upper and lower surfaces of the resonance chamber while being spaced a predetermined distance from respective sidewalls.

10. The injection apparatus according to claim 5, wherein the second nozzle is composed of quartz.

11. The injection apparatus according to claim 6, wherein the second nozzle is composed of quartz.

12. The injection apparatus according to claim 5, further comprising:
    a temperature controller around the nozzle to prevent a rapid increase in temperature of the raw material passing through the nozzle.

13. The injection apparatus according to claim 12, wherein the temperature controller comprises a first temperature controller positioned around the first nozzle, and a second temperature controller positioned around the third nozzle.

14. The injection apparatus according to claim 13, wherein the first temperature controller comprises a cold water pipe through which cold water can flow, and the second temperature controller comprises a heat exchanger to cool the third nozzle.

15. The injection apparatus according to claim 7, further comprising:
    a controller connected to the magnetron to control operation of the magnetron, wherein the controller comprises a power source to supply power, and a microwave output variation device to vary an output of the microwaves.

* * * * *